(12) United States Patent
Chen et al.

(10) Patent No.: US 11,426,993 B2
(45) Date of Patent: Aug. 30, 2022

(54) THREE-DIMENSIONAL PRINTING SYSTEM

(71) Applicant: Young Optics Inc., Hsinchu (TW)

(72) Inventors: Chao-Shun Chen, Hsinchu (TW); Kun-Yao Chen, Hsinchu (TW); Chien-Hsing Tsai, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 1579 days.

(21) Appl. No.: 15/249,966

(22) Filed: Aug. 29, 2016

(65) Prior Publication Data
US 2018/0056605 A1 Mar. 1, 2018

(51) Int. Cl.
*B29C 64/129* (2017.01)
*B29C 64/286* (2017.01)
*B33Y 30/00* (2015.01)

(52) U.S. Cl.
CPC ............ *B33Y 30/00* (2014.12); *B29C 64/129* (2017.08); *B29C 64/286* (2017.08)

(58) Field of Classification Search
CPC ... B29C 64/106; B29C 64/124; B29C 64/129; B29C 64/135; B29C 64/268; B29C 64/286; B29C 64/393; B33Y 30/00; G02B 15/14
USPC ........................................ 425/174.4; 359/690
See application file for complete search history.

(56) References Cited

U.S. PATENT DOCUMENTS

| | | | |
|---|---|---|---|
| 7,336,429 B2 * | 2/2008 | Shibayama | G02B 15/173 359/684 |
| 2017/0120332 A1 * | 5/2017 | DeMuth | B28B 1/001 |

FOREIGN PATENT DOCUMENTS

| | | |
|---|---|---|
| CN | 103786346 A | 5/2014 |
| CN | 103921444 A | 7/2014 |
| CN | 104093547 A | 10/2014 |

OTHER PUBLICATIONS

Liu et al. (CN 103786346_ Machine Translation) (Year: 2014).*

* cited by examiner

*Primary Examiner* — Yunju Kim
(74) *Attorney, Agent, or Firm* — Muncy, Geissler, Olds & Lowe, P.C.

(57) ABSTRACT

A three-dimensional printing system includes a build device and an optical projection engine. The build device includes a curing tank, a photocurable material and a build platform, and the photocurable material and the build platform is disposed in the curing tank. The optical projection engine has a zoom lens for projecting image beams with at least a first pixel size and a second pixel size on the build platform to cure the photocurable material, and the first pixel size is different to the second pixel size.

13 Claims, 4 Drawing Sheets

THREE-DIMENSIONAL PRINTING SYSTEM

BACKGROUND OF THE INVENTION a. Field of the Invention

The invention relates to a three-dimensional printing system.

b. Description of the Related Art

Current techniques for three-dimensional (3D) printing include photopolymerization, where a photocurable polymer material is irradiated by light to form polymer chains that are stacked up layer by layer to form a three-dimensional object with mechanical properties. However, conventional optical projection systems used for 3D object fabrication fail to vary the pixel size (resolution) and printing area of image patterns in real time. Accordingly, there has been a desire to provide a new design allowed to vary the pixel size (resolution) and printing area in real time during the printing process to form a three-dimensional object having different resolutions respectively for different portions.

BRIEF SUMMARY OF THE INVENTION

According to one aspect of the present disclosure, a three-dimensional printing system includes a build device and an optical projection engine. The build device includes a curing tank, a photocurable material and a build platform, and the photocurable material and the build platform is disposed in the curing tank. The optical projection engine has a zoom lens for projecting image beams with at least a first pixel size and a second pixel size on the build platform to cure the photocurable material, and the first pixel size is different to the second pixel size.

According to another aspect of the present disclosure, a three-dimensional printing system includes a build device and an optical projection engine. The build device includes a curing tank, a photocurable material and a build platform, and the photocurable material and the build platform is disposed in the curing tank. The optical projection engine projects image beams on the build platform to cure the photocurable material to form a three-dimensional object. The optical projection engine has a zoom lens for varying the pixel size of the image beams in real time, the three-dimensional object includes at least a first slice with a first resolution and a second slice with a second resolution, and the first resolution is different to the second resolution.

According to the above embodiment, the pixel size (resolution) may be varied in real time during the printing process according to actual demands to form a three-dimensional object having different resolutions respectively for different portions. Besides, since the magnification of a zoom lens is adjustable, an area of each slice of the three-dimensional object is adjustable relying on the zoom function of the optical projection engine.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
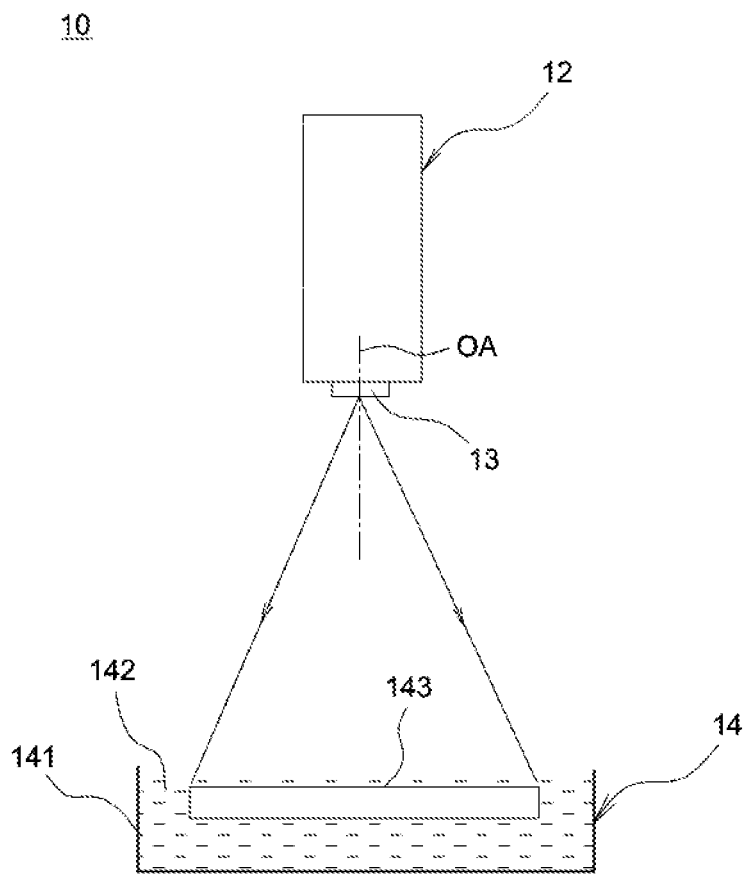
FIG. 1 shows a schematic diagram illustrating a three-dimensional printing system according to an embodiment of the invention.

FIG. 1 shows a schematic diagram illustrating a three-dimensional printing system according to an embodiment of the invention. As shown in FIG. 1, a three-dimensional printing system 10 includes an optical projection engine 12 and a build device 14. The build device 14 may, for example, includes a curing tank 141, a photocurable material 142 and a build platform 143. The photocurable material 142 and the build platform 143 are disposed in the curing tank 141. In this embodiment, the optical projection engine 12 has a zoom lens 13 that allows for a magnification of the pixel size. Light beams such as ultra violet may enter the zoom lens 13 of the optical projection engine 12 to form image beams by the zoom lens 13, and the image beams are projected on the build platform 143 to cure the photocurable material 142 on the build platform 143, usually layer-bylayer, to form a three-dimensional object. In this embodiment, the zoom lens 13 may include a number of individual lenses that may be either fixed or slide along an optical axis OA to change the magnification.

Figure 2:
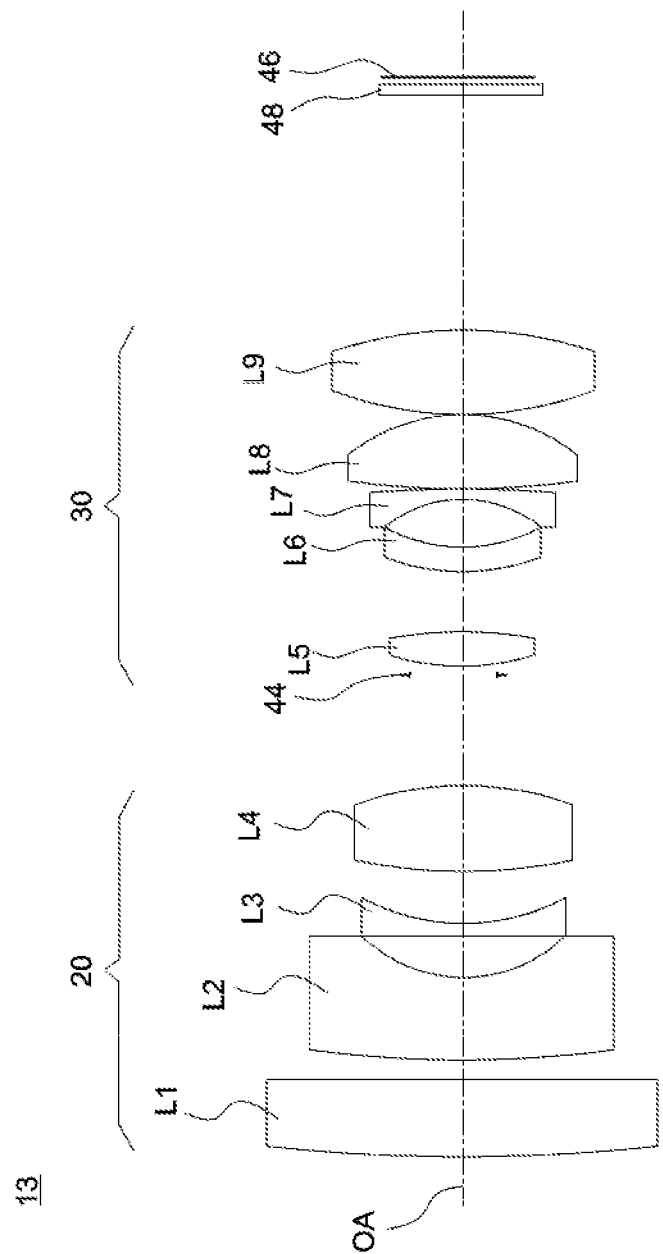
FIG. 2 shows a design example of a zoom lens according to an embodiment of the invention.

FIG. 2 shows a design example of a zoom lens 13 according to an embodiment of the invention. As illustrated in FIG. 2, the zoom lens 13 may include a first lens group 20 and a second lens group 30. The first lens group 20 includes four lenses L1, L2, L3 and L4 arranged in order, along an optical axis OA, from a magnified side (on the left of FIG. 2) to a minified side (on the right of FIG. 2). The second lens group 30 includes five lenses L5, L6, L7, L8 and L9 arranged in order, along the optical axis OA, from the magnified side to the minified side. The refractive powers of the lens L1-L9 may be positive, negative, negative, positive, positive, negative, negative, positive and positive, respectively. Each of the first lens group 20 and the second lens group 30 may include at least one aspheric surface. Further, an aperture stop 44 is located between the first lens group 20 and the second lens group 30, the minified side may be disposed with a cover glass 46 and an image sensor having an image plane 48. The cover glass 46 is disposed between the second lens group 30 and the image plane 48. At least one of the first lens group 20 and the second lens group 30 is moveable to alter the size of a beam of light travelling therethrough and thus the overall magnification. Once the magnification of the lens system is adjustable, a pixel size (resolution) of an image and a projection area formed by the zoom lens 13 is allowed to vary. Note the zoom lens is not limited to any particular type, as long as the zoon function is provided.

Figure 3:
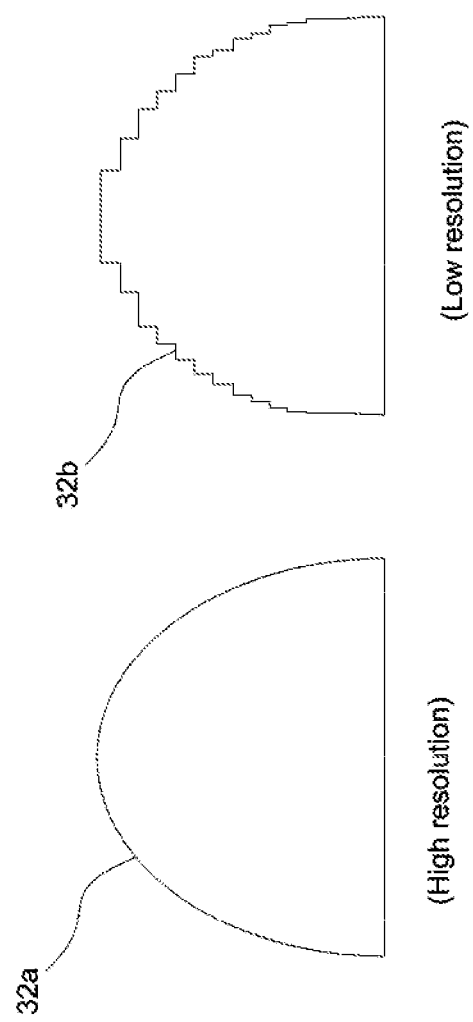
FIG. 3 shows a comparison diagram illustrating the contrast between a high-resolution object slice and a low-resolution object slice.

Therefore, through the zoom function of the zoom lens 13, the optical projection engine 12 may form images on the build platform 143 relying on at least two different pixel sizes (resolutions). For example, as shown in FIG. 3, the zoom lens 13 may project image beams with a small pixel size on the build platform 143 to form an object slice 32a with high resolution (having smooth edges) and may project image beams with a large pixel size to form an object slice 32b with low resolution (having jagged edges). Under the circumstance, the three-dimensional printing system 10 may have different resolution modes respectively for different periods in an entire curing time T to allow a printed three-dimensional object to have different resolutions for different portions. For example, the optical projection engine 12 may perform zoom operations to achieve two different pixel size of 100 um and 50 um. In the first period T1 (0-50% of the curing time T), the optical projection engine 12 may cure the photocurable material using a first mode (pixel size=100 um), cure the photocurable material using a second mode (pixel size=50 um) in the second period T2 (50%-75% of the curing time T), and cure the photocurable material using the first mode (pixel size=100 um) in the third period T3 (75%-100% of the curing time T).

Figure 4A:
FIGS. 4A, 4B and 4C show schematic diagrams illustrating different resolutions respectively for different portions of a three-dimensional object according to an embodiment of the invention.
Figure 4B:
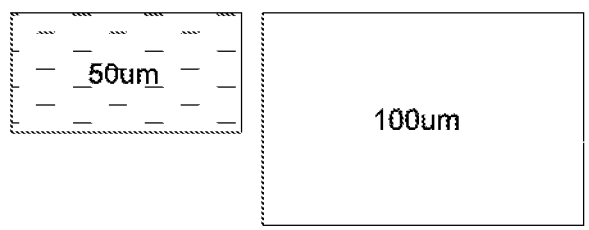
Figure 4C:
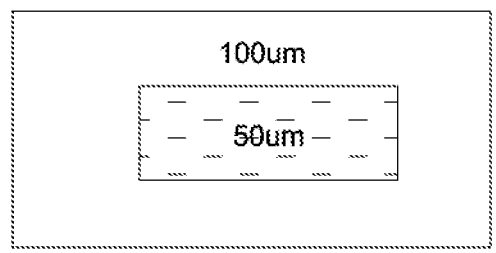

According to the above embodiments, the pixel size (resolution) may be varied in real time during the printing process according to actual demands to form a three-dimensional object having different resolutions respectively for different portions. For example, as shown in FIG. 4A, the photocurable material 142 are cured layer by layer to form a three-dimensional object. During the printing process, the optical projection engine 12 may cure one layer of the photocurable material using a first mode (pixel size=100 um) and cure another layer using a second mode (pixel size=50 um). Therefore, the three-dimensional object may have at least a first object layer with a first pixel size (resolution) and a second object layer with a second pixel size (resolution) different to the first pixel size (resolution). Further, the optical projection engine 12 may cure different portions of the photocurable material using different modes of resolution. For example, as shown in FIG. 4B, the three-dimensional object 50 may include at least a first slice and a second slice disposed side by side, the first slice has a first pixel size (100 um), and the second slice has a different second pixel size (50 um). Alternatively, as shown in FIG. 4C, the second slice may surround the first slice, where the first slice has a first pixel size (100 um), and the second slice has a different second pixel size (50 um). Besides, the magnification of the zoom lens is adjustable to alter a projection area of the optical projection engine 12 on the build platform 143, and thus an area of each slice is adjustable relying on the zoom function of the optical projection engine 12.

Note the use of the three-dimensional printing system 10 is not limited to forming a single three-dimensional object with different resolutions for its different portions. For example, the three-dimensional printing system 10 may have a first mode of operation for projecting an image at comparatively high resolution and a second mode of operation for projecting an image at comparatively low resolution. Taking FIG. 4B as an example, the left-side first slice may belong to a first three-dimensional object/product to be formed, and the right-side second slice may belong to a different second three-dimensional object/product to be formed. The three-dimensional printing system 10 may use the first mode of operation to cure the first slice of the first object/product at high resolution (50 um) and use the second mode of operation to cure the second slice of the second object/product at low resolution (100 um). Certainly, the three-dimensional printing system 10 may arbitrarily switch between the first mode and the second mode of operation according to actual demands during the formation of the different objects/products, and the number of modes of operation and the number of objects/products to be formed in the same operation are not limited.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A three-dimensional printing system, comprising:
   a build device comprising a curing tank and a build platform, and the build platform being disposed in the curing tank; and
   an optical projection engine having a zoom lens for projecting ultraviolet image beams with at least a first pixel size and a second pixel size on the build platform, and the first pixel size being different to the second pixel size.

2. The three-dimensional printing system as claimed in claim 1, wherein an entire time for curing a photocurable material to form a three-dimensional object includes at least a first period and a second period, and the optical projection engine projecting the ultraviolet image beams with the first pixel size in the first period and projecting the ultraviolet image beams with the second pixel size in the second period.

3. The three-dimensional printing system as claimed in claim 1, wherein the build device further comprises a photocurable material, and the photocurable material are cured layer by layer to form a three-dimensional object.

4. The three-dimensional printing system as claimed in claim 3, wherein the three-dimensional object has at least a first object layer and a second object layer stacked on the first object layer, the first layer has the first pixel size, and the second layer has the second pixel size.

5. The three-dimensional printing system as claimed in claim 1, wherein a projection area of the optical projection engine on the build platform is adjustable through the magnification of the zoom lens.

6. The three-dimensional printing system as claimed in claim 1, wherein the three-dimensional object comprises at least a first slice and a second slice disposed side by side, the first slice has the first pixel size, and the second slice has the second pixel size.

7. The three-dimensional printing system as claimed in claim 1, wherein the three-dimensional object comprises at least a first slice and a second slice, the second slice surrounds the first slice, the first slice has the first pixel size, and the second slice has the second pixel size.

8. A three-dimensional printing system, comprising:
   a build device comprising a curing tank, a photocurable material and a build platform, and the build platform being disposed in the curing tank; and
   an optical projection engine having a zoom lens for projecting ultraviolet image beams on the build platform to form a three-dimensional object, the optical projection engine being capable of varying the pixel size of the ultraviolet image beams in real time, the three-dimensional object comprising at least a first slice with a first resolution and a second slice with a second resolution, and the first resolution being different to the second resolution.

9. The three-dimensional printing system as claimed in claim 8, wherein an area of each of the first slice and the second slice is adjustable through the zoom lens.

10. The three-dimensional printing system as claimed in claim 8, wherein the second slice is stacked on the first slice.

11. The three-dimensional printing system as claimed in claim 8, wherein the first slice and the second slice are disposed side by side.

12. The three-dimensional printing system as claimed in claim 8, wherein the second slice surrounds the first slice.

13. A three-dimensional printing system, comprising:
   a build device comprising a curing tank and a build platform, and the build platform being disposed in the curing tank; and
   an optical projection engine having a zoom lens for projecting ultraviolet image beams on the build platform, the optical projection engine having at least a first mode of operation for projecting an image at comparatively high resolution and a second mode of operation for projecting an image at comparatively low resolution, wherein at least a part of a first three-dimensional object is formed by the first mode of operation, and at least a part of a second three-dimensional object is formed by the second mode of operation.

* * * * *